United States Patent
Choi

(10) Patent No.: US 11,397,689 B2
(45) Date of Patent: Jul. 26, 2022

(54) MEMORY MANAGER HAVING AN ADDRESS TRANSLATION FUNCTION, DATA PROCESSING STRUCTURE INCLUDING THE SAME, AND METHOD FOR GENERATING ADDRESS TRANSLATION INFORMATION

(71) Applicant: SK hynix Inc., Icheon-si (KR)

(72) Inventor: Kyu Hyun Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 113 days.

(21) Appl. No.: 16/596,104

(22) Filed: Oct. 8, 2019

(65) Prior Publication Data

US 2020/0285590 A1 Sep. 10, 2020

(30) Foreign Application Priority Data

Mar. 6, 2019 (KR) .......................... 10-2019-0025655

(51) Int. Cl.
*G06F 12/00* (2006.01)
*G06F 12/1018* (2016.01)
(Continued)

(52) U.S. Cl.
CPC ...... *G06F 12/1018* (2013.01); *G06F 12/0873* (2013.01); *G06F 12/1054* (2013.01);
(Continued)

(58) Field of Classification Search
CPC ............ G06F 12/1018; G06F 12/1054; G06F 12/0873; G06F 12/1063; G06F 2212/152; G06F 2212/7201; G06F 12/109; G06F 2212/1044; G06F 2212/657; G06F 2212/1024; G06F 2212/1028; Y02D 10/00
(Continued)

(56) References Cited

U.S. PATENT DOCUMENTS

| 7,872,657 B1 | 1/2011 | Edmondson et al. |
| 2006/0026383 A1* | 2/2006 | Dinechin ............ G06F 12/1036 |
| | | 711/207 |

(Continued)

FOREIGN PATENT DOCUMENTS

KR 101025354 B1 3/2011

*Primary Examiner* — Mardochee Chery
(74) *Attorney, Agent, or Firm* — William Park & Associates Ltd.

(57) ABSTRACT

A memory manager includes an internal memory and a hash function circuit.
The internal memory includes a V2H (virtual address to hash function) table and an exception mapping table. The V2H table stores at least one virtual address group and a type information on a hash function mapped to the virtual address group. The exception mapping table stores at least one exception virtual address not translated into a physical address by the hash function in the virtual address group and a physical address mapped to the exception virtual address. The has function circuit checks, when a virtual address is provided from a host, type information on a hash function mapped to a virtual address group including the virtual address, by referring to the V2H table included in the internal memory. The has function translates the virtual address into a physical address by using the hash function corresponding to the type information.

16 Claims, 6 Drawing Sheets

(51) Int. Cl.
*G06F 12/1045* (2016.01)
*G06F 12/0873* (2016.01)

(52) U.S. Cl.
CPC .... *G06F 12/1063* (2013.01); *G06F 2212/152* (2013.01); *G06F 2212/7201* (2013.01)

(58) Field of Classification Search
USPC .......................................................... 711/103
See application file for complete search history.

(56) References Cited

U.S. PATENT DOCUMENTS

| | | | |
|---|---|---|---|
| 2008/0301256 A1* | 12/2008 | McWilliams | G06F 12/0806 709/214 |
| 2014/0334494 A1* | 11/2014 | Lin | H04L 49/3009 370/400 |
| 2018/0024941 A1* | 1/2018 | Pape | G06F 12/1027 711/122 |

* cited by examiner 232 (virtual address to hash function table, V2HT)

| Base VA | Size | HF type | E | |
|---------|--------|---------|---|---|
| 0xaeff | 0x1000 | HF 1 | 0 | ←V2H Entry |
| ⋮ | ⋮ | ⋮ | ⋮ | |
| 0xc100 | 0x2000 | HF 4 | 1 | |
| 0xe200 | 0x4000 | None | 0 | |

233 (exception mapping table, EMT)

| EVA | PA | HF | |
|--------|--------|----|---|
| 0xd120 | 0xf020 | 0 | ←EV2P Entry |
| 0x8fbc | 0x1800 | 1 | |
| ⋮ | ⋮ | ⋮ | | ved in a V2H (virtual address to hash function) table included in an internal memory; storing at least one exception virtual
MEMORY MANAGER HAVING AN ADDRESS TRANSLATION FUNCTION, DATA PROCESSING STRUCTURE INCLUDING THE SAME, AND METHOD FOR GENERATING ADDRESS TRANSLATION INFORMATION

CROSS-REFERENCES TO RELATED APPLICATION

The present application claims priority under 35 U.S.C. § 119(a) to Korean application number 10-2019-0025655, filed on Mar. 6, 2019, in the Korean Intellectual Property Office, which is incorporated herein by reference in its entirety.

BACKGROUND

1. Technical Field

Various embodiments generally relate to a computer system, and more particularly, to a memory manager having an address translation function, a data processing structure including the same and a method for generating address translation information.

2. Related Art

In order to process data, a computer system mainly uses a central processing unit (CPU) operating at a high speed. These days, with the development of semiconductor processing, a CPU has become able to process data at a high speed.

However, data to be provided to the CPU for processing is positioned in an external memory of which the operation speed is relatively slower than the operation speed of the CPU. Due to this fact, a problem may be caused in that data processing in the CPU is delayed. In order to solve such a problem, a cache is built in the CPU to compensate for the slow operation speed of the external memory.

Recently, as an absolute amount of data to be processed increases, a multi-layered cache structure is adopted to compensate for a speed reduction due to frequent data loading. Also, researches on a data processing structure for processing data in a memory (PIM: processing in-memory) and a data processing structure for processing data near a memory (PNM: processing near-memory) have been actively carried out.

When entrusting a calculation task to a data processing structure such as the PIM and the PNM, the CPU translates a virtual address into a physical address and provides the translated physical address to the data processing structure, so as to allow the data processing structure to perform an accurate calculation. In this regard, a problem may be caused in that, each time the CPU entrusts a task to a data processing structure, an overhead to translate a virtual address into a physical address occurs. Therefore, research for translating a virtual address into a physical address in a data processing structure has been carried out.

SUMMARY

In an embodiment, a memory manager may include: an internal memory including a V2H (virtual address to hash function) table in which at least one virtual address group and type information on a hash function mapped to the virtual address group are stored, and an exception mapping table in which at least one exception virtual address not translated into a physical address by the hash function in the virtual address group and a physical address mapped to the exception virtual address are stored; and a hash function module configured to check, when a virtual address is provided from a host, a type information on a hash function mapped to a virtual address group including the virtual address, by referring to the V2H table included in the internal memory, and translate the virtual address into a physical address by using the hash function corresponding to the type information.

In an embodiment, a data processing structure may include: a calculation circuit configured by a plurality of calculators which perform calculations according to a command provided from a central processing unit (CPU); and a memory manager configured to translate a virtual address provided from the CPU into a physical address by using a hash function, and provide the translated physical address and the command provided from the CPU, to an external memory.

In an embodiment, a method for generating address translation information may include: checking whether mapping for a virtual address group as a mapping target, by using a hash function selected among a plurality of hash functions is possible; determining whether all virtual addresses in the virtual address group as the mapping target are translated into physical addresses; and generating, when all the virtual addresses are translated into physical addresses, a V2H (virtual address to hash function) entry in which an exception field storing an information indicating whether an exception virtual address exists is set to a first value indicating that no exception virtual address exists.

In an embodiment, a method for translating a virtual address into a physical address may include: storing at least one virtual address group and type information on a hash function mapped to the virtual address group within a V2H (virtual address to hash function) table included in an internal memory; storing at least one exception virtual address not translated into a physical address by the hash function in the virtual address group and a physical address mapped to the exception virtual address within an exception mapping table included in the internal memory; checking, with a hash function module, when a virtual address is provided from a host, type information on a hash function mapped to a virtual address group including the virtual address, by referring to the V2H table included in the internal memory; and translating, with the hash function module, the virtual address into a physical address by using the hash function corresponding to the type information.

DETAILED DESCRIPTION

Hereinafter, a memory manager having an address translation function, a data processing structure including the same and a method for generating address translation information will be described below with reference to the accompanying drawings through various examples of embodiments.

Various embodiments may be directed to a memory manager having an address translation function, a data processing structure including the same and a method for generating address translation information, capable of reducing the size of a space for storing an address translation information, a time required for address translation and power consumed for address translation.

According to the embodiments, since a virtual address is translated into a physical address in a data processing structure, it might not be necessary to perform address translation in a CPU, whereby it may be possible to prevent the occurrence of an overhead for address translation in the CPU.

Also, according to the embodiments, since an address translation information table in which a hash function for address translation is mapped to each virtual address group is generated and stored, it may be possible to reduce the size of a space required to store address translation information.

Further, according to the embodiments, since most virtual addresses are translated into physical addresses by using a hash function, the count of accesses to an exception mapping table having a structure similar to an existing translation lookaside buffer (TLB) may be significantly reduced, whereby power consumed for address translation may be minimized.

Figure 1:
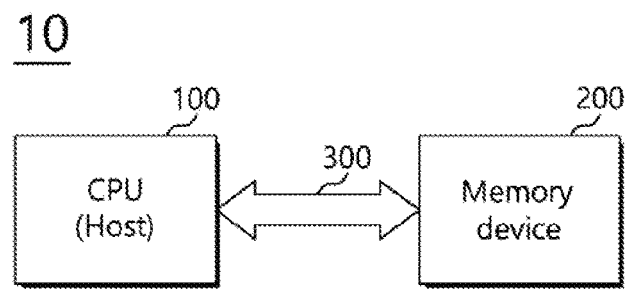
FIG. 1 is a diagram illustrating a representation of an example of a system in accordance with an embodiment.

FIG. 1 is a diagram illustrating a representation of an example of a system 10 in accordance with an embodiment.

Referring to FIG. 1, the system 10 may include a central processing unit (CPU) 100 and a memory device 200 which are electrically coupled to a system bus 300. According to an embodiment, the system 10 may further include a cache which is built in the central processing unit 100 or is separately coupled to the central processing unit 100. The central processing unit (CPU) 100 may be referred to as a host, an external host, an external device or a processor host, and hereinafter, will be mainly referred to as a CPU.

In FIG. 1, the reference numeral 200 may represent a packaging or housing of the memory device 200. For example, the memory device 200 may be packaged to include one or more memory chips such as DRAM (dynamic random access memory) chips or other semiconductor-based memory chips. In the disclosure, details such as the number of dies/chips per memory module, the number of memory banks per chip and the internal configuration of memory banks in a chip, or the storage capacity of each chip are not fixed, and hence, may be different for different embodiments.

In an embodiment, the CPU 100 may be a general purpose microprocessor. In the discussion herein, the terms "CPU" and "processor" may be used interchangeably for ease of discussion. However, it is understood that, instead of or in addition to the CPU, the processor may contain any other type of processors such as, for example, a microcontroller, a Digital Signal Processor (DSP), a Graphics Processing Unit (GPU), a dedicated Application Specific Integrated Circuit (ASIC) processor, and the like.

Furthermore, in an embodiment, the CPU 100 may include more than one core, which may be operative in a distributed processing environment. The CPU 100 may be configured to execute instructions and to process data according to a particular Instruction Set Architecture (ISA). For example, the particular Instruction Set Architecture (ISA) may be at least any one or a combination among an x86 instruction set architecture (32-bit or 64-bit versions), a PowerPC® ISA and a MIPS (Microprocessor without Interlocked Pipeline Stages) instruction set architecture relying on RISC (Reduced Instruction Set Computer) ISA. In one embodiment, the external host may be a System on Chip (SoC) having functionalities in addition to a processor or CPU functionality.

It is noted here that only one memory device 200 is illustrated as a part of the system 10 in FIG. 1 for ease of illustration only. However, in a practical implementation, the system 10 may include more than one memory devices, and all of them may be of the same type or may be of different types. In an embodiment, the system 10 may include 3DS as well as non-3DS memory modules under operative control of the CPU 100. Generally, the memory device 200 may be any semiconductor-based memory or storage system, some examples of which are mentioned earlier. Furthermore, it is understood that the units illustrated as parts of the system 10 in FIG. 1 or FIG. 7 may themselves contain other components. However, such components are not illustrated in FIGS. 1 and 7 because these components are not fixed and may be different for different embodiments.

Figure 2:
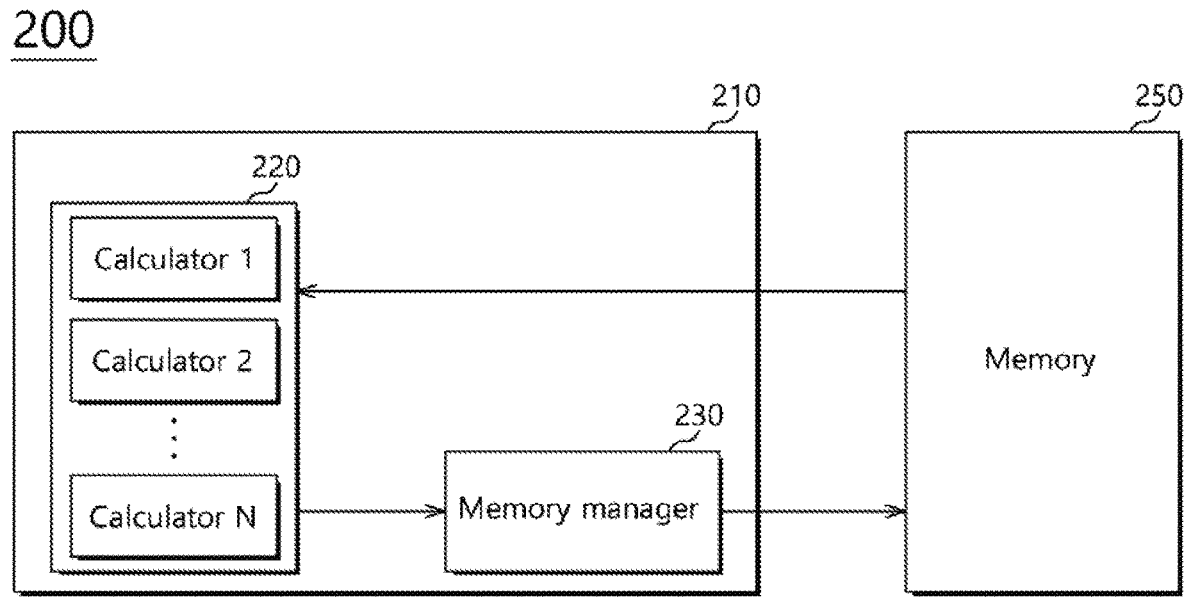
FIG. 2 is a diagram illustrating a representation of an example of the configuration of a memory device illustrated in FIG. 1.
Figure 3:
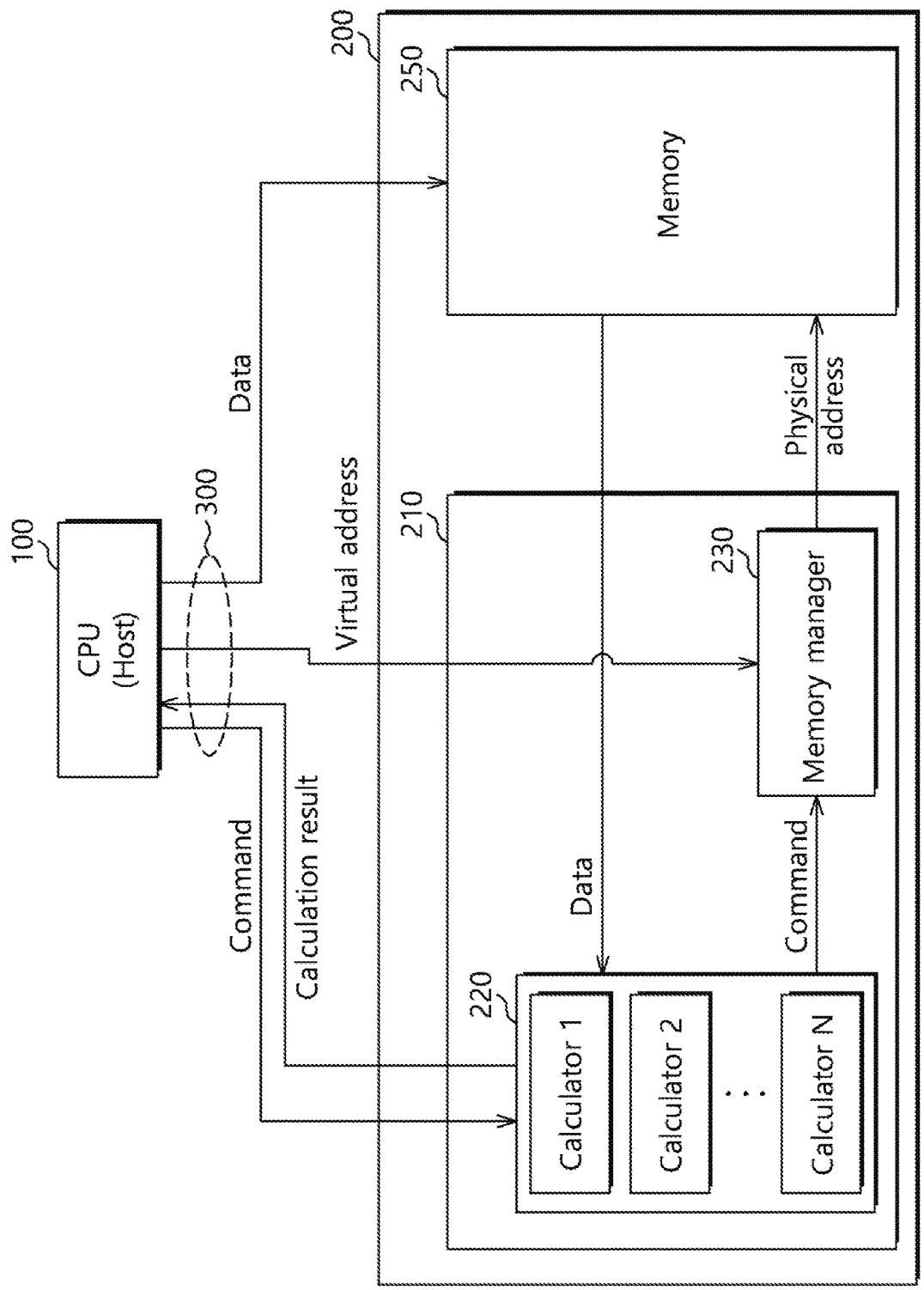
FIG. 3 is a diagram illustrating a representation of an example of a signal flow between a CPU and the memory device.

FIG. 2 is a diagram illustrating a representation of an example of the configuration of the memory device 200 illustrated in FIG. 1, and FIG. 3 is a diagram illustrating a representation of an example of signal flows between the CPU 100 and the memory device 200 and between a data processing structure 210 and a memory 250 of the memory device 200. Here, a signal is used as a term collectively referring to a command, a virtual address, data, a calculation result, and so forth.

Referring to FIG. 2, the memory device 200 in accordance with an embodiment may include the data processing structure 210 and the memory 250. For the sake of convenience in explanation, FIG. 2 illustrates that the data processing structure 210 and the memory 250 are separated from each other. However, in an embodiment, the data processing structure 210 may be realized as at least one of a PIM (processing in-memory) structure which is built in the memory 250 and processes data and a PNM (processing near-memory) structure which is disposed near the memory 250 and processes data. While not illustrated in FIG. 2, the data processing structure 210 and the memory 250 may be electrically coupled through an internal bus or a TSV (Through Silicon Via) and may exchange data and signals.

The data processing structure 210 may include a calculation circuit 220 and a memory manager 230. The calculation circuit 220 may include a plurality of calculators 1 to N. While FIG. 2 illustrates an example in which the plurality of calculators 1 to N are disposed in a one-dimensional arrangement, it is to be noted that these embodiments are not specifically limited thereto, and the plurality of calculators 1 to N may be disposed in a multi-dimensional arrangement. The plurality of calculators 1 to N may perform calculations based on a command provided from the CPU 100 and data transmitted from the memory 250. The plurality of calculators 1 to N may simultaneously perform calculations, and accordingly, may simultaneously calculate a large amount of data.

The memory manager 230 may be configured to translate a virtual address provided from the CPU 100 into a physical address and provide the translated physical address to the memory 250. The memory 250 may be located outside from the memory manager 230. Thus, the memory 250 may be called an external memory. A virtual address may be referred to as a virtual page number, and a physical address may be referred to as a physical page number. In the discussion herein, the terms "virtual address," "virtual page number," "physical address" and "physical page number" may be used interchangeably for ease of discussion.

In an embodiment, the memory manager 230 may translate a virtual address into a physical address by using a hash function. Also, the memory manager 230 may translate a virtual address which cannot be translated by using a hash function, into a physical address, by referring to an exception mapping table 233 (see FIG. 4A) or a page mapping table 255 (see FIG. 5). The memory manager 230 may provide a translated physical address to the memory 250. The internal configuration and operation of the memory manager 230 will be described later with reference to drawings.

The memory 250 may perform an operation of reading data stored at a corresponding position or writing data to a corresponding position, based on the physical address provided from the memory manager 230.

Referring to FIG. 3, the CPU 100 may provide a command to the calculation circuit 220 of the data processing structure 210, and may be provided with a calculation result from the calculation circuit 220. The CPU 100 may provide a virtual address to the memory manager 230. In an embodiment, in the case where data is to be written to the memory 250, the CPU 100 may provide the data to the memory 250.

The calculation circuit 220 may provide the command provided from the CPU 100, to the memory manager 230. The memory manager 230 may translate the virtual address provided from the CPU 100 into a physical address and provide the translated physical address and the command provided from the calculation circuit 220, to the memory 250. The memory 250 may perform an operation of reading or writing data, based on the physical address and the command provided from the memory manager 230.

For example, in the case where the provided command is a read command, the memory 250 may read data stored at a position corresponding to the provided physical address, and may provide the read data to the respective calculators 1 to N of the calculation circuit 220. In the case where the provided command is a write command, the memory 250 may write the data provided from the CPU 100, to a position corresponding to the provided physical address.

Figures 4A, 4B, 4C:
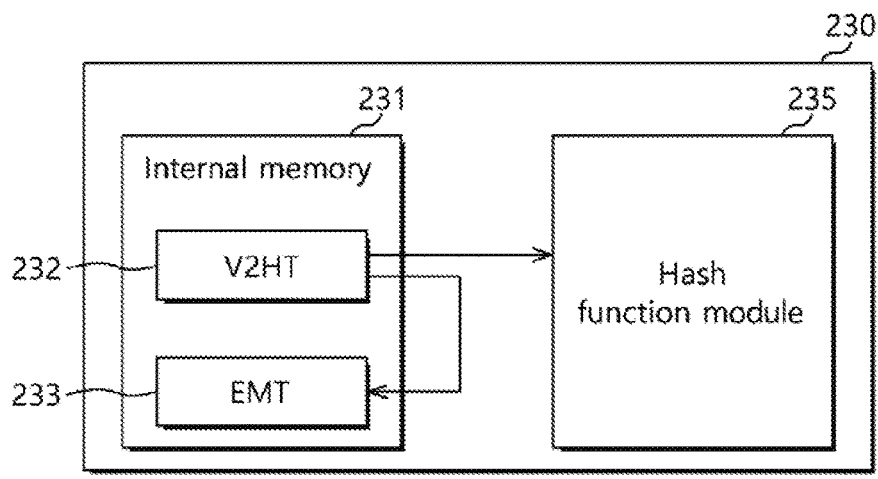
FIG. 4A is a diagram illustrating a representation of an example of the configuration of a memory manager in accordance with an embodiment.
FIG. 4B is a diagram illustrating a representation of an example of a V2H (virtual address to hash function) table in accordance with an embodiment.
FIG. 4C is a diagram illustrating a representation of an example of an exception mapping table in accordance with an embodiment.

FIG. 4A is a diagram illustrating a representation of an example of the configuration of the memory manager 230 in accordance with an embodiment, FIG. 4B is a diagram illustrating a representation of an example of a V2H table (virtual address to hash function table: V2HT) in accordance with an embodiment, and FIG. 4C is a diagram illustrating a representation of an example of an exception mapping table (EMT) in accordance with an embodiment.

Referring to FIG. 4A, the memory manager 230 may include an internal memory 231 and a hash function module 235. It will be understood that the memory manager 230 may include other components in addition to the components illustrated in FIG. 4A. However, such components are not illustrated in FIG. 4A because these components are not fixed and may be different for different embodiments.

The internal memory 231 may be an SRAM (static random access memory), but it is to be noted that these embodiments are not specifically limited thereto. The internal memory 231 may include a V2H table (V2HT) 232 which is constituted by V2H entries (virtual address to hash function entries) and an exception mapping table (EMT) 233 which is constituted by EV2P entries (exception virtual address to physical address entries).

The V2H table (V2HT) 232 and the exception mapping table (EMT) 233 may be generated and stored by the CPU 100. In an embodiment, an operation system (OS) executed on the CPU 100 may generate a plurality of virtual address groups by grouping a plurality of virtual addresses, may determine a mappable hash function for each of the plurality of virtual address groups, and may generate the V2H table (V2HT) 232 by mapping the hash function determined for each virtual address group. The operation system (OS) may control the memory manager 230 to store the generated V2H table (V2HT) 232 in the internal memory 231 in the memory manager 230 of the memory device 200.

In this way, in a practical implementation, the V2H table (V2HT) 232 and the exception mapping table (EMT) 233 may be generated and stored by the operation system (OS) executed on the CPU 100. However, for the sake of convenience in explanation, it is described that they are generated and stored by the CPU 100.

In an embodiment, a V2H entry may be used as a term that indicates an entry including a virtual address and a hash function type mapped to the virtual address. Referring to FIG. 4B, a V2H entry may include a base virtual address field Base VA, a virtual address size field Size, a hash function type information field HF type, and an exception field E indicating whether an exception virtual address exists or not. That is to say, a V2H entry may include information (a base virtual address and a size) on a virtual address group including a plurality of virtual addresses, a type information on a hash function mapped to the virtual address group, and information on whether a virtual address (that is, an exception virtual address) which is not translated into a physical address by the mapped hash function exists in the virtual address group.

In an embodiment, the CPU 100 may define an index for each of all hash functions to be used, and may use the defined index as a type information on a hash function included in a V2H entry. The CPU 100 may store a first value or a second value in the exception field E of the V2H entry. The first value may be 0 and the second value may be 1, but it is to be noted that the embodiments are not specifically limited thereto.

For example, if a hash function is mapped to a specific virtual address group and all virtual addresses in the corresponding virtual address group are translated into physical addresses by the mapped hash function, the CPU 100 may determine that no exception virtual address exists in the specific virtual address group, and may store the first value in the exception field E of the V2H entry. On the other hand, if a hash function is mapped to a specific virtual address group and a virtual address which is not translated into a physical address by the mapped hash function exists among virtual addresses in the corresponding virtual address group, the CPU 100 may determine that an exception virtual address exists in the specific virtual address group, and may store the second value in the exception field E of the V2H entry.

In the case where no hash function mapped to a specific virtual address group exists, the CPU 100 may store an information indicating that no mapped hash function exists, for example, 'None,' in the hash function field HF type of the V2H entry for the corresponding virtual address group. Also, in the case where a hash function mapped to a specific virtual address group exists but the number of exception virtual addresses existing in the corresponding virtual address group is larger than the number of remaining entries of the exception mapping table EMT, the CPU 100 may store an information None indicating that no mapped hash function exists, in the hash function field HF type of the V2H entry for the corresponding virtual address group.

In an embodiment, an EV2P entry may be used as a term that indicates an entry including an exception virtual address and a physical address mapped to the exception virtual address. Referring to FIG. 4C, the EV2P entry may include an exception virtual address field EVA, a physical address field PA and a hash function field HF indicating whether an exception virtual address is associated with a hash function. In other words, the EV2P entry may include information on an exception virtual address, information on a physical address mapped to the exception virtual address and information on whether the exception virtual address corresponds to a virtual address which is not translated into a physical address by a hash function. In an embodiment, an exception virtual address may mean a virtual address which is not translated into a physical address by using a hash function mapped to a virtual address group among a plurality of virtual addresses included in the corresponding virtual address group.

Referring to FIG. 4C, the CPU 100 may store a first value or a second value in the hash function field HF of the EV2P entry. The first value may be 0 and the second value may be 1, but it is to be noted that these embodiments are not specifically limited thereto. For example, in the case where an exception virtual address (e.g., 0xd120) is a virtual address included in a virtual address group to which a hash function is mapped, the CPU 100 may store the first value in the hash function field HF of the EV2P entry. On the other hand, in the case where an exception virtual address (e.g., 0x8fbc) is a virtual address not included in a virtual address group to which a hash function is mapped, the CPU 100 may store the second value in the hash function field HF of the EV2P entry.

The hash function module 235 may translate a virtual address provided from the CPU 100 into a physical address by using a hash function. For example, the hash function module 235 may use a virtual address as an input value of a hash function, and may use an output value of the hash function as a physical address. In an embodiment, the hash function module 235 may be realized by hardware, software or a combination of hardware and software. The hash function module 235 may be configured to perform address translation by using a plurality of hash functions. For example, the hash function module 235 may include a plurality of hash function calculators (not illustrated) which are realized by different types of hash functions. Hash functions to be used in the hash function module 235 may be hash functions which perform a left shift calculation, an exclusive OR calculation, a modular calculation, a bit shuffling calculation, and so forth, but it is to be noted that these embodiments are not specifically limited thereto. Besides, hash functions may be various hash functions that can be simply implemented by hardware or software.

Figure 5:
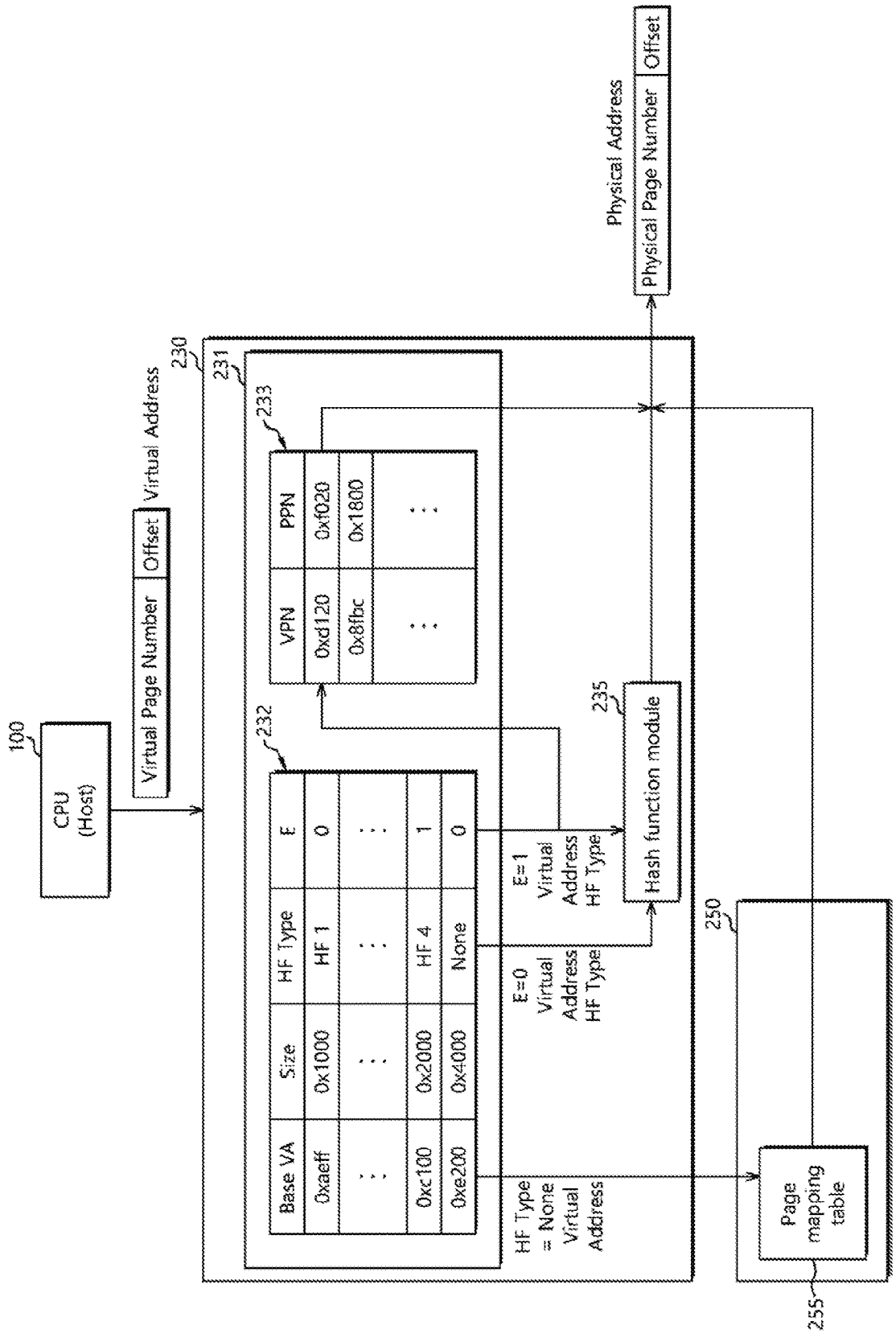
FIG. 5 is a diagram illustrating a representation of an example of a process in which a virtual address is translated into a physical address in the memory manager in accordance with an embodiment.

FIG. 5 is a diagram illustrating a representation of an example of a process in which a virtual address is translated into a physical address in the memory manager 230 in accordance with an embodiment.

Referring to FIG. 5, if a virtual address including a virtual page number and an offset is provided from the CPU 100, the memory manager 230 may search for a virtual address group including the provided virtual address in the V2H table (V2HT) 232.

In one example, if no hash function mapped to a virtual address group including the provided virtual address exists (HF type=None), the memory manager 230 may not use the V2H table (V2HT) 232 and the exception mapping table (EMT) 233, and may translate the virtual address into a corresponding physical address by referring to the page mapping table 255 stored in the memory 250. The page mapping table 255 stored in the memory 250 includes physical addresses for the entire storage region of the memory 250 and virtual addresses mapped to the physical addresses.

In another example, if a hash function mapped to a virtual address group including the provided virtual address exists (HF type=HF 1) and no exception virtual address exists in the corresponding virtual address group (E=0), the memory manager 230 may provide the virtual address and the hash function type information HF 1 to the hash function module 235, and the hash function module 235 may translate the virtual address into a physical address by using the hash function corresponding to the hash function type information HF 1.

In still another example, if a hash function mapped to a virtual address group including the provided virtual address exists (HF type=HF 4) and an exception virtual address exists in the corresponding virtual address group (E=1), the memory manager 230 may search for the virtual address in the exception mapping table (EMT) 233. If the virtual address exists in the exception mapping table (EMT) 233, the memory manager 230 may translate the provided virtual address into a physical address mapped to the virtual address in the exception mapping table (EMT) 233. If the virtual address does not exist in the exception mapping table (EMT) 233, the memory manager 230 may provide the virtual address and the hash function type information HF 4 to the hash function module 235, and the hash function module 235 may translate the virtual address into a physical address by using the hash function corresponding to the hash function type information HF 4.

The memory manager 230 may simultaneously or sequentially perform the operation of searching for the provided virtual address in the exception mapping table (EMT) 233 and the operation of translating the virtual address into the physical address by using the hash function.

As described above, the translated physical address may be provided to the memory 250.

Figure 6:
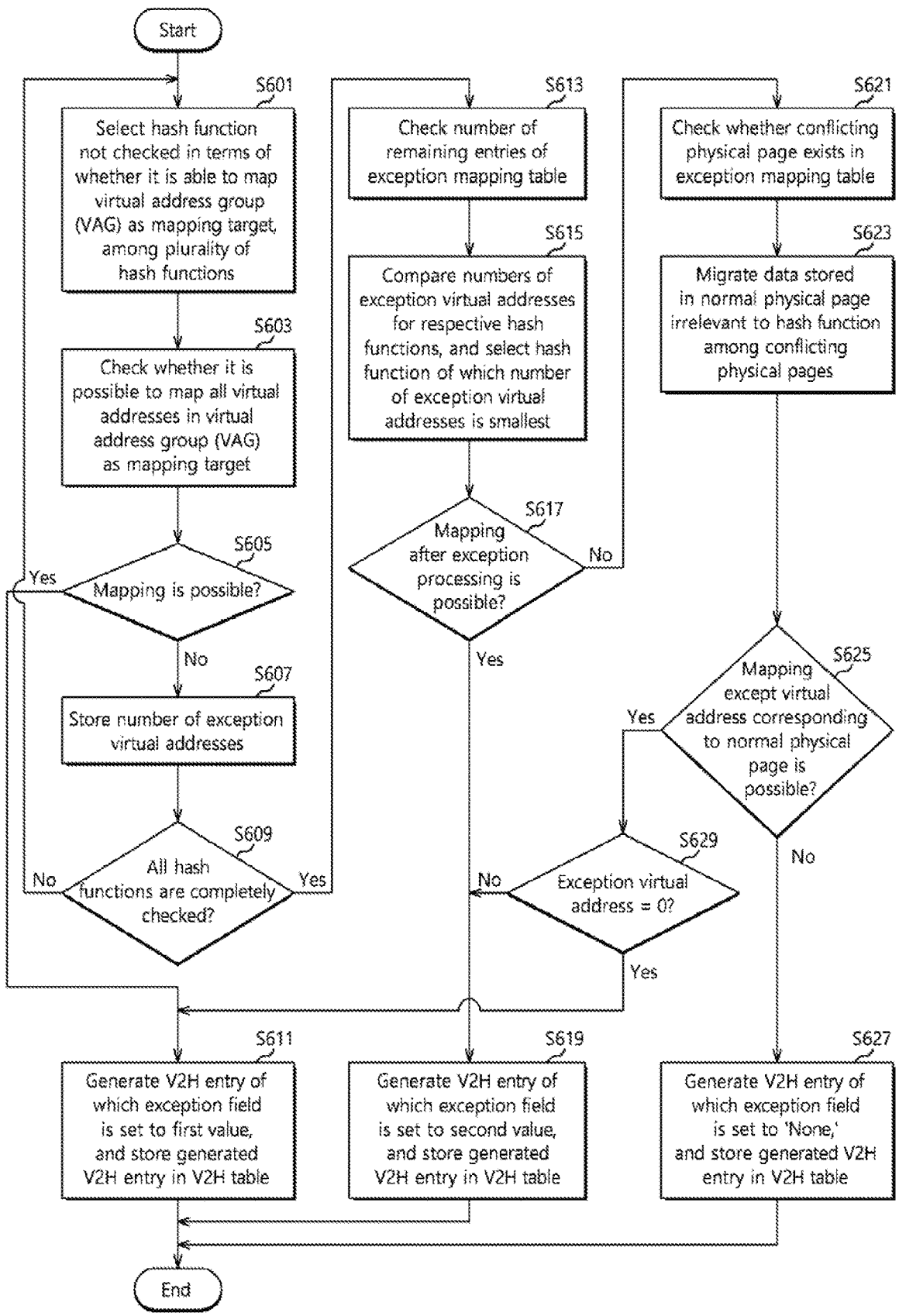
FIG. 6 is a representation of an example of a flow chart to assist in the explanation of a method for generating address translation information in accordance with an embodiment.

FIG. 6 is a representation of an example of a flow chart to assist in the explanation of a method for generating an address translation information table in accordance with an embodiment. In explaining the method for generating an address translation information table in accordance with an embodiment, with reference to FIG. 6, reference may be made to at least one among FIGS. 1 to 5. In an embodiment, for the sake of convenience in explanation, it will be described that a subject for performing respective steps is the CPU 100. However, it will be appreciated that a subject for performing respective steps is actually an operation system (OS) executed on the CPU 100. Since definitions for terms used in an embodiment were described above, further descriptions thereof will be omitted herein. Further, for the sake of convenience in explanation, a method for generating an address translation information table for one virtual address group among a plurality of virtual address groups is illustrated in FIG. 6. It will be appreciated that steps S601 to S629 illustrated in FIG. 6 may be repeatedly performed for each of the plurality of virtual address groups.

At step S601, the CPU 100 may select a hash function not checked in terms of whether it is able to map a virtual address group as a mapping target, among a plurality of hash functions. As described above, in an embodiment, a plurality of various hash functions may be used for address translation, that is, to translate a virtual address into a physical address, the suitability of all the hash functions may be checked for one virtual address group, to determine an optimal hash function to be mapped to the corresponding virtual address group.

At step S603, the CPU 100 may check whether it is possible to map a plurality of virtual addresses in the virtual address group as the mapping target by using the hash function selected at the step S601. Here, checking whether mapping is possible may correspond to checking whether each of the plurality of virtual addresses is changed into a physical address in the course of translating each of the plurality of virtual addresses into a physical address by using the selected hash function and checking whether a translated physical address is a valid physical address.

At step S605, the CPU 100 may determine whether it is possible to map the virtual address group as the mapping target by using the selected hash function, based on a result of checking performed at the step S603. Here, whether mapping is possible may mean whether all the virtual addresses in the virtual address group as the mapping target are translated into physical addresses by the selected hash function without an exception and a conflict. If it is determined that mapping is possible (Yes), the process may proceed to step S611. If it is determined that mapping is not possible (No), the process may proceed to step S607.

At the step S607, the CPU 100 may store the number of exception virtual addresses existing in the virtual address group as the mapping target when performing address translation using the hash function selected at the step S601, by matching the number with the corresponding hash function. For example, the CPU 100 may store the number of exception virtual addresses for each hash function, in the internal memory 231 of the memory manager 230. The number of exception virtual addresses for each hash function may be a natural number including 0.

At step S609, the CPU 100 may determine whether checking is completed for all hash functions. In the case where checking for all hash functions is not completed (No), the process may proceed to the step S601. In the case where checking for all hash functions is completed (Yes), the process may proceed to step S613.

At the step S611, the CPU 100 may generate a V2H (virtual address to hash function) entry in which the exception virtual address field EVA (see FIG. 4B) is set to the first value and which includes type information on the hash function selected at the step S601, and may store the generated V2H entry in the V2H table in the internal memory 231 of the memory manager 230. The generated V2H entry may include a start virtual address and size information of the virtual address group as the mapping target.

At the step S613, the CPU 100 may check the number of remaining entries of the exception mapping table (EMT) 233 (see FIG. 4C). The number of remaining entries of the exception mapping table (EMT) 233 may be understood as a size of a space (or a region) in which EV2P (exception virtual address to physical address) entries are not stored in the exception mapping table (EMT) 233.

At step S615, the CPU 100 may compare the numbers of exception virtual addresses for respective hash functions, and thereby, may select a hash function (hereinafter referred to as a 'first hash function') of which the number of exception virtual addresses is minimal.

At step S617, the CPU 100 may determine whether mapping after exception processing is possible when the selected first hash function is used. For example, the CPU 100 may determine whether mapping after exception processing is possible, based on whether all remaining virtual addresses except exception virtual addresses among the virtual addresses in the virtual address group as the mapping target are translated into physical addresses without a conflict by using the first hash function. The exception processing may mean generating EV2P (exception virtual address to physical address) entries for exception virtual addresses existing in the virtual address group as the mapping target and storing the generated EV2P entries in the exception mapping table (EMT) 233. If mapping is not possible even after the exception processing, the process may proceed to step S621. If mapping is possible after the exception processing, the process may proceed to step S619.

At the step S619, the CPU 100 may generate a V2H (virtual address to hash function) entry in which the exception virtual address field EVA is set to the second value and which includes a type information on the hash function selected at the step S601, and may store the generated V2H entry in the V2H table in the internal memory 231 of the memory manager 230. The generated V2H entry may include a start virtual address and size information of the virtual address group as the mapping target.

At the step S621, the CPU 100 may check whether a conflicting physical page exists, by referring to the exception mapping table (EMT) 233. A conflicting physical page may mean a page which has the same physical address as any one of physical addresses translated from remaining virtual addresses except the exception virtual addresses in the virtual address group as the mapping target by using the first hash function at the step S617.

At step S623, the CPU 100 may migrate data stored in a normal physical page which is not associated with a hash function among conflicting physical pages, to another physical page. For example, the CPU 100 may determine whether a conflicting physical page is a physical address mapped to an exception virtual address of another virtual address group of which a hash function is determined, that is, whether a conflicting physical page is associated with a hash function, by referring to the hash function field HF corresponding to a conflicting physical page in the exception mapping table (EMT) 233 illustrated in FIG. 4C. The CPU 100 may not migrate data stored in a conflicting physical page associated with a hash function, and may migrate only data stored a conflicting physical page not associated with a hash function (that is, a normal physical page), to another physical page.

At step S625, the CPU 100 may determine whether all remaining virtual addresses except the exception virtual addresses and virtual addresses corresponding to the normal physical pages in the virtual address group as the mapping target are translated into physical addresses by the first hash function, that is, whether mapping is possible. If it is determined that mapping is possible (Yes), the process may proceed to step S629. If it is determined that mapping is not possible (No), the process may proceed to step S627.

At the step S627, the CPU 100 may generate a V2H (virtual address to hash function) entry in which the hash function type information field HF type (see FIG. 4B) is set to None, and may store the generated V2H entry in the V2H table in the internal memory 231 of the memory manager 230. The generated V2H entry may include a start virtual address and size information of the virtual address group as the mapping target.

At the step S629, the CPU 100 may determine whether the number of exception virtual addresses included in the virtual address group as the mapping target is 0. If the number of exception virtual addresses is 0 (Yes), the process may proceed to the step S611. If the number of exception virtual addresses is not 0 (No), the process may proceed to the step S619.

For the sake of convenience in explanation, FIG. 6 illustrates only that whether mapping for the virtual address group as the mapping target is possible is checked by selecting (S615) one hash function for which the number of exception virtual addresses is minimal and an address translation information on the virtual address group as the mapping target is generated depending on a checking result. However, in this regard, it is to be noted that all hash functions which have the numbers of virtual addresses smaller than the number of remaining entries of the exception mapping table (EMT) 233 may be selected and the steps S615 to S629 may be repeatedly performed by the number of the selected hash functions until a mappable hash function is determined.

Figure 7:
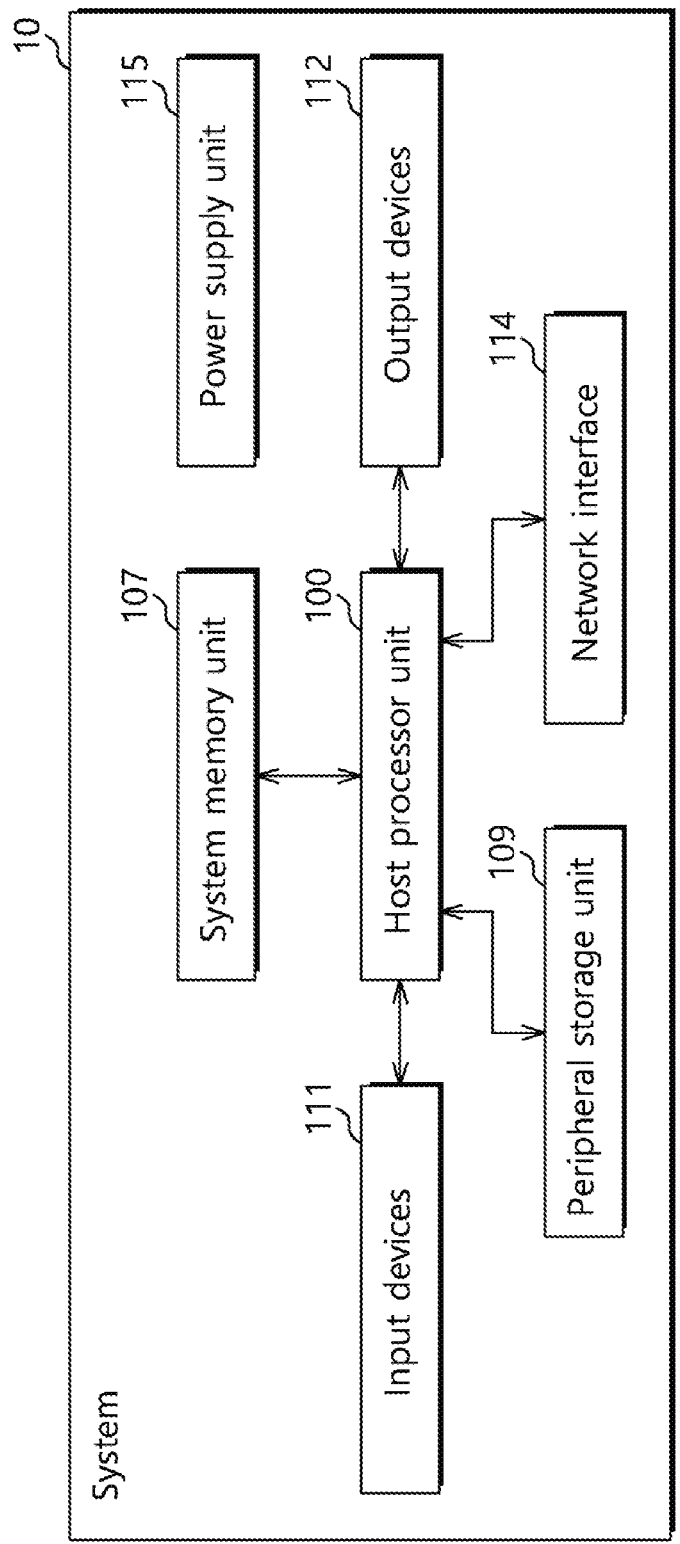
FIG. 7 is a diagram illustrating a representation of an example of an overall layout of a system including a memory device in accordance with an embodiment.

FIG. 7 is a diagram illustrating a representation of an example of an overall layout of the system 10 (including the memory device) of FIG. 1 in accordance with an embodiment. Hence, for the sake of ease in reference and discussion, the same reference numerals as in FIG. 1 will be used for the common system components and units in FIG. 7.

In FIG. 7, a host processor unit 100 is illustrated coupled to a system memory unit 107, a peripheral storage unit 109, one or more input devices 111, one or more output devices 112 and a network interface unit 114. In some embodiments, the system 10 may include more than one instance of the devices or units illustrated. Some examples of the system 10 may include a computer system (desktop or laptop), a tablet computer, a mobile device, a cellular phone, a video gaming unit or console, a machine-to-machine (M2M) communication unit, a stateless "thin" client system, or any other type of computing or data processing device. In various embodiments, the system 10 may be configured as a rack-mountable server system, a standalone system or any other suitable form factor. In some embodiments, the system 10 may be configured as a client system rather than a server system.

In particular embodiments, the host processor unit 100 may include more than one CPU, and the system 10 may include more than one host processor unit 100. For example, more than one host processor unit 100 may have a distributed processing configuration. When the system 10 is a multiprocessor system, there may be more than one instance of a CPU or processor. As mentioned earlier, the host processor unit 100 may be a System on Chip (SoC).

The system memory unit 107 may include at least one memory device, like the memory device 200 of FIG. 1. As mentioned earlier, the memory device 200 may be any semiconductor-based storage system such as, for example, a DRAM, an SRAM, a PRAM, an RRAM, a CBRAM, an MRAM, an STT-MRAM, and the like.

In some embodiments, the system memory unit 107 may include at least one memory device, like the memory device 200 of FIG. 1. As mentioned earlier, the memory device 200 may include one or more non-3DS memory devices and at least one 3DS memory device. The non-3DS memory may include a DDR/DDR2/DDR3/DDR4 SDRAM, a Rambus® DRAM, a flash memory, and various types of read only memory (ROM). Also, in some embodiments, the system memory unit 107 may include multiple different types of semiconductor memories, as opposed to a single type of memory. Also, in an embodiment of the disclosure, the system memory unit 107 may include the memory manager 230 of FIGS. 2 to 4A capable of translating a virtual address provided from the host processor unit 100 into a corresponding physical address.

The peripheral storage unit 109, in various embodiments, may include a configuration for supporting magnetic, optical, magneto-optical or solid-state storage media such as hard drives, optical disks (such as CDs or DVDs), non-volatile RAM devices, etc. In some embodiments, the peripheral storage unit 109 may include more complex storage devices/systems. For example, the peripheral storage unit 109 may include disk arrays which may be in a suitable RAID (Redundant Array of Independent Disks) configuration, Storage Area Networks (SANs) which may be coupled to the host processor unit 100 via a standard Small Computer System Interface (SCSI), a Fibre Channel interface, a Firewire® (IEEE 1394) interface, or another suitable interface. In an embodiment, the peripheral storage unit 109 may be coupled to the host processor unit 100 via a standard peripheral interface such as, for example, the Peripheral Component Interface Express (PCI Express™) standard based interface, the Universal Serial Bus (USB) protocol based interface, or the IEEE 1394 (Firewire®) protocol based interface.

In particular embodiments, the input devices 111 may include a computer keyboard, a mouse or other pointing device, a touchpad, a joystick, or any other type of data input device. The output devices 112 may include a graphics/display device, a computer screen, an audio speaker, an alarm system, a CAD/CAM (Computer Aided Design/Computer Aided Machining) system, a video game station, or any other type of data output or process control device. In some embodiments, the input devices 111 and the output devices 112 may be coupled to the host processor unit 100 via an I/O or peripheral interfaces.

In an embodiment, the network interface 114 may communicate with the host processor unit 100 to enable the system 10 to couple to a network. In another embodiment, the network interface 114 may be absent altogether. The network interface 114 may include any suitable devices, media and/or protocol content for connecting the system 10 to a network in a wired or wireless manner. In various embodiments, the network may include Local Area Networks (LANs), Wide Area Networks (WANs), wired or wireless Ethernet, telecommunication networks, or other suitable types of networks.

The system 10 may include an on-board power supply unit 115 to provide electrical power to various system components illustrated in FIG. 7. The power supply unit 115 may receive batteries or may be connectable to an AC electrical power outlet. In an embodiment, the power supply unit 115 may convert solar energy into electrical power.

In the preceding description, for purposes of explanation and not limitation, specific details are set forth in order to provide a thorough understanding of the disclosed technology. However, it will be apparent to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g., any elements developed to perform the same function, regardless of structure.

Thus, for example, it will be appreciated by those skilled in the art that block diagrams herein, such as, for example, FIGS. 1 to 3, 4A and 5, can represent conceptual views of illustrative circuitry or other functional units embodying the principles of the technology. It will be appreciated that the flow charts of FIG. 6 may represent various processes or innovative aspects which may be substantially performed by, for example, the host processor unit 100.

In particular embodiments, the CPU or the host processor unit 100 may include, for example, a general purpose processor, a special purpose processor, a conventional processor, a digital signal processor (DSP), a plurality of microprocessors, one or more microprocessors in association with a DSP core, a microcontroller, Application Specific Integrated Circuits (ASICs), Field Programmable Gate Arrays (FPGAs) circuits, any other type of integrated circuit (IC), and/or a state machine.

When certain aspects require software-based processing, such software or program code may reside in a computer-readable data storage medium. Such data storage medium may be a part of the peripheral storage unit 109 in the embodiment of FIG. 7, or may be a part of the internal memory 231 of the memory manager 230 of FIG. 4A. The host processor unit 100 may execute relevant instructions stored on such a medium to carry out the software-based processing.

Such relevant instructions may include, for example, different API-provided functions discussed earlier, as well as any ancillary program code that may be needed to effectuate the PIM functionality discussed herein. The computer-readable data storage medium may be a non-transitory data storage medium containing a program, software, firmware, or microcode for execution by a general purpose computer or a processor mentioned above. Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

Alternative embodiments of the disclosure may include additional components responsible for providing additional functionality, including any of the functionality identified above and/or any functionality necessary to support the solution as per the teachings of the disclosure. Although features and elements are described above in particular combinations, each feature or element can be used alone without the other features and elements or in various combinations with or without other features. As mentioned before, the functions of some of the elements in the system 10, such as, for example, the host processor unit 100, may be provided through the use of hardware (such as logic circuits) and/or hardware capable of executing software/firmware in the form of coded instructions or microcode stored on a computer-readable data storage medium. Thus, such functions and functional blocks are to be understood as being either hardware-implemented and/or computer-implemented, and thus machine-implemented.

As described above, an operation of translating a virtual address into a physical address may be executed in not the CPU 100 but the memory device 200. Therefore, it may be possible to prevent the occurrence of an overhead for performing address translation in the CPU 100. Also, since address translation information table in which a hash function for address translation is mapped to each virtual address group has a size substantially smaller than an existing translation lookaside buffer (TLB) used for address translation in a conventional CPU, it may be possible to reduce the size of a space required to store address translation information. Further, since most virtual addresses are translated into physical addresses by using a hash function, the count of accesses to an exception mapping table having a structure similar to the existing translation lookaside buffer (TLB) may be significantly reduced, whereby power consumed for address translation may be minimized.

The memory device 200 may be a semiconductor memory. The memory manager 230 in the memory device 230 may operate to interface with the host 100, and may transmit a virtual address provided from the host 100 into a physical address, by using the address translation information table stored in the internal memory 231. Due to this fact, as aforementioned, since the CPU 100 does not need to perform the operation of translating a virtual address into a physical address, the burden of the CPU 100 may be reduced, and thereby the performance of the system 10 may be remarkably improved.

While various embodiments have been described above, it will be understood to those skilled in the art that the embodiments described are examples only. Accordingly, the memory manager having an address translation function, the data processing structure including the same and the method for generating address translation information described herein should not be limited based on the described embodiments.

What is claimed is:

1. A memory manager comprising:
an internal memory including a V2H (virtual address to hash function) table in which at least one virtual address group and type information on a hash function mapped to the virtual address group are stored, and an exception mapping table in which at least one exception virtual address not translated into a physical address by the hash function in the virtual address group and a physical address mapped to the exception virtual address are stored; and
a hash function circuit configured to check, when a virtual address is provided from a host, type information on a hash function mapped to a virtual address group including the virtual address, by referring to the V2H table included in the internal memory, translate the virtual address into a physical address by using the hash function corresponding to the type information, and provide the physical address to an external memory for writing or reading data, wherein the V2H table includes at least one V2H entry, and the V2H entry includes an exception field indicating whether or not an exception virtual address exists, wherein the exception field of the V2H entry is set to a first value indicating that the exception virtual address does not exist or a second value indicating that the exception virtual address exists, and wherein, when the exception field of a V2H entry corresponding to the virtual address provided from the host is set to the first value, the memory manager translates the virtual address into a physical address by using only the hash function circuit.

2. The memory manager according to claim 1, wherein the V2H entry further includes a base virtual address field, a virtual address size field, and a hash function type information field.

3. The memory manager according to claim 1, wherein, when the exception field of a V2H entry corresponding to the virtual address provided from the host is set to the second value, the memory manager translates the virtual address into a physical address by using both the exception mapping table and the hash function circuit.

4. The memory manager according to claim 1, wherein, when information indicating that no mapped hash function exists is stored in the hash function type information field of a V2H entry corresponding to the virtual address provided from the host, the memory manager translates the virtual address into a physical address by referring to a page mapping table stored in an external memory.

5. The memory manager according to claim 1,
wherein the exception mapping table comprises at least one EV2P (exception virtual address to physical address) entry, and
wherein the EV2P entry includes an exception virtual address field, a physical address field, and a hash function field indicating whether an exception virtual address stored in the exception virtual address field is associated with a hash function.

6. A data processing structure comprising:
a calculation circuit configured by a plurality of calculators which perform calculations according to a command provided from a central processing unit (CPU); and
a memory manager, with an internal memory, configured to translate a virtual address provided from the CPU into a physical address by using a hash function, and provide the translated physical address and the command provided from the CPU, to an external memory for writing or reading data,
the internal memory including a V2H (virtual address to hash function) table comprising at least one V2H entry which includes an exception field indicating whether or not an exception virtual address exists,
a hash function circuit configured to check whether the exception field of the V2H entry is set to a first value indicating that the exception virtual address does not exist or a second value indicating that the exception virtual address exists, and
wherein the hash function circuit is configured to translate the virtual address into a physical address by using only the hash function circuit, when the exception field of a V2H entry corresponding to the virtual address provided from the host is set to the first value.

7. The data processing structure according to claim 6, wherein the external memory reads data according to the physical address and the command provided from the memory manager, and provides the read data to the plurality of calculators of the calculation circuit, and
wherein the plurality of calculators perform calculations corresponding to the command, for the data provided from the external memory.

8. The data processing structure according to claim 6,
wherein the V2H table is configured to store at least one virtual address group and a type information on a hash function mapped to the virtual address group, and
the internal memory further includes an exception mapping table in which at least one exception virtual address not translated into a physical address by the hash function in the virtual address group is stored; and
the hash function circuit configured to check, when a virtual address is provided from the CPU, a type information on a hash function mapped to a virtual address group including the virtual address, by referring to the V2H table included in the internal memory, and translate the virtual address into a physical address by using the hash function corresponding to the type information.

9. The data processing structure according to claim 8,
wherein the V2H entry includes a base virtual address field, a virtual address size field, and a hash function type information field.

10. The data processing structure according to claim 8, wherein the exception mapping table comprises an EV2P (exception virtual address to physical address) entry which is configured by the at least one exception virtual address and a physical address mapped to the at least one exception virtual address.

11. The data processing structure according to claim 10, wherein the EV2P entry includes an exception virtual address field, a physical address field, and a hash function field indicating whether an exception virtual address stored in the exception virtual address field is associated with a hash function.

12. A method for generating address translation information, comprising:
checking whether mapping for a virtual address group as a mapping target, by using a first hash function selected among a plurality of hash functions is possible;
determining whether all virtual addresses in the virtual address group as the mapping target are translated into physical addresses by the selected first hash function;
generating, when all the virtual addresses are translated into physical addresses, a V2H (virtual address to hash function) entry in which an exception field storing an information indicating whether an exception virtual address exists is set to a first value indicating that no exception virtual address exists;
providing the physical address to an external memory for writing or reading data,
wherein the exception field of the V2H entry is set to a second value indicating that the exception virtual address exists, and
when the exception field of a V2H entry corresponding to the virtual address provided from the host is set to the first value, the memory manager translates the virtual address into a physical address by using only the hash function circuit.

13. The method according to claim 12, further comprising, after the determining of whether all the virtual addresses are translated into the physical addresses:

storing, when all the virtual addresses are not translated into physical addresses, the number of exception virtual addresses included in the virtual address group as the mapping target; and determining whether checking of whether mapping for the virtual address group as the mapping target is possible and completed, by using all of the plurality of hash functions.

14. The method according to claim 13, further comprising, after checking whether mapping for the virtual address group as the mapping target is possible and completed:

comparing the numbers of exception virtual addresses stored for the plurality of respective hash functions, and selecting a second hash function which has a minimal number of exception virtual addresses;

determining whether all remaining virtual addresses except the exception virtual addresses in the virtual address group as the mapping target are translated into physical addresses by the second hash function; and generating, when all the remaining virtual addresses are translated into physical addresses by the second hash function, a V2H entry in which the exception field is set to a second value indicating that an exception virtual address exists.

15. The method according to claim 14, further comprising, after the determining of whether all the remaining virtual addresses are translated into physical addresses by the second hash function:

checking, when all the remaining virtual addresses are not translated into physical addresses by the second hash function, whether an exception virtual address to which the same physical address as a physical address translated by the second hash function is mapped exists;

determining, when the exception virtual address to which the same physical address as a physical address translated by the second hash function is mapped exists, whether the physical address mapped to the exception virtual address is a physical address which is translated by the other hash functions except the second hash function; and migrating, when the physical address mapped to the exception virtual address is a physical address which is not associated with the other hash functions, data stored at a position corresponding to the corresponding physical address, to another position.

16. The method according to claim 15, further comprising:

determining whether all remaining virtual addresses except the exception virtual addresses and a virtual address corresponding to a physical address of which data is migrated to another position, in the virtual address group as the mapping target, are translated into physical addresses by the second hash function; and generating, when all the remaining virtual addresses are not translated into physical addresses by the second hash function, a V2H entry in which a hash function type information field is set to a value indicating that no mapping hash function exists.

* * * * *